US010540475B2

(12) United States Patent
Chang et al.

(10) Patent No.: US 10,540,475 B2
(45) Date of Patent: Jan. 21, 2020

(54) SYSTEM FOR MANUFACTURING A SEMICONDUCTOR DEVICE

(71) Applicant: TAIWAN SEMICONDUCTOR MANUFACTURING COMPANY, LTD., Hsinchu (TW)

(72) Inventors: Chi-Wen Chang, Yuanlin Township (TW); Hui Yu Lee, Hsinchu (TW); Ya Yun Liu, Jhubei (TW); Jui-Feng Kuan, Zhubei (TW); Yi-Kan Cheng, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/149,572

(22) Filed: Oct. 2, 2018

(65) Prior Publication Data

US 2019/0034578 A1    Jan. 31, 2019

Related U.S. Application Data

(60) Continuation of application No. 15/943,428, filed on Apr. 2, 2018, now Pat. No. 10,095,827, which is a continuation of application No. 14/940,218, filed on Nov. 13, 2015, now Pat. No. 9,934,352, which is a division of application No. 14/080,892, filed on Nov. 15, 2013, now Pat. No. 9,213,797.

(51) Int. Cl.
*G06F 9/455* (2018.01)
*G06F 17/50* (2006.01)

(52) U.S. Cl.
CPC ...... *G06F 17/5081* (2013.01); *G06F 17/5009* (2013.01); *G06F 17/5068* (2013.01); *G06F 2217/80* (2013.01)

(58) Field of Classification Search
USPC ................. 716/111, 110, 113, 133, 134, 136
See application file for complete search history.

(56) References Cited

U.S. PATENT DOCUMENTS

| | | | |
|---|---|---|---|
| 7,366,997 B1* | 4/2008 | Rahmat | G06F 17/5036 716/111 |
| 2002/0145204 A1* | 10/2002 | Naka | H01L 21/563 257/778 |
| 2008/0026493 A1* | 1/2008 | Shakouri | G06Q 10/04 438/17 |
| 2009/0077508 A1* | 3/2009 | Rubin | G01R 31/318357 716/136 |
| 2010/0052112 A1* | 3/2010 | Rogers | B81B 7/0093 257/625 |
| 2012/0168416 A1* | 7/2012 | Graf | G05D 23/1934 219/209 |

(Continued)

*Primary Examiner* — Brian Ngo
(74) *Attorney, Agent, or Firm* — Hauptman Ham, LLP (57) ABSTRACT

A system including a memory; and a simulation tool connected to the memory. The simulation tool is configured to receive information related to a plurality of dies. The simulation tool is further configured to receive a plurality of input vectors. The simulation tool is further configured to determining a temperature profile for a first die of the plurality of dies. The simulation tool is further configured to simulate operation of a second die of the plurality of dies based on the determined temperature profile and the received plurality of input vectors.

20 Claims, 7 Drawing Sheets

(56) References Cited

U.S. PATENT DOCUMENTS

2013/0286595 A1* 10/2013 Lisk ................... H01L 23/433
                                                                             361/719
2014/0096102 A1* 4/2014 Fu ...................... G06F 17/50
                                                                             716/133

* cited by examiner

SYSTEM FOR MANUFACTURING A SEMICONDUCTOR DEVICE

PRIORITY CLAIM

The present application is a continuation of U.S. application Ser. No. 15/943,428, filed Apr. 2, 2018, which is a continuation of U.S. application Ser. No. 14/940,218, filed Nov. 13, 2015, now U.S. Pat. No. 9,934,352, issued Apr. 3, 2018, which is a divisional of U.S. application Ser. No. 14/080,892, filed Nov. 15, 2013, now U.S. Pat. No. 9,213,797, issued Dec. 15, 2015, which are incorporated herein by reference in their entireties.

BACKGROUND

The recent trend in miniaturizing integrated circuits (ICs) has resulted in smaller devices which consume less power, yet provide more functionality at higher speeds. The miniaturization process has also resulted in stricter design and manufacturing specifications. Various electronic design automation (EDA) tools are developed to generate, optimize and verify designs for semiconductor devices while ensuring that the design and manufacturing specifications are met.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

It is to be understood that the following disclosure provides many different embodiments, or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent, however, that one or more embodiments may be practiced without these specific details. Like reference numerals in the drawings denote like elements.

In some embodiments, an operation of a first die in a three-dimensional (3D) integrated circuit (IC) is simulated based on an environment temperature, which is determined based on an operational temperature of a second die in the 3DIC. In at least one embodiment, operations of different circuit elements of the first die are simulated based on different environment temperatures, which, in turn, are determined based on different operational temperatures in different areas of the second die. As a result, it is possible to simulate operations of one or more dies in a 3DIC, while taking into consideration thermal effects from operations of one or more other dies in the 3DIC. Compared to other approaches where a single, constant environment temperature is assumed to be presented across all dies of a 3DIC, the described simulation approach in accordance with some embodiments is closer to the real-life operation of the 3DIC and is, therefore, more accurate.

Figure 1:
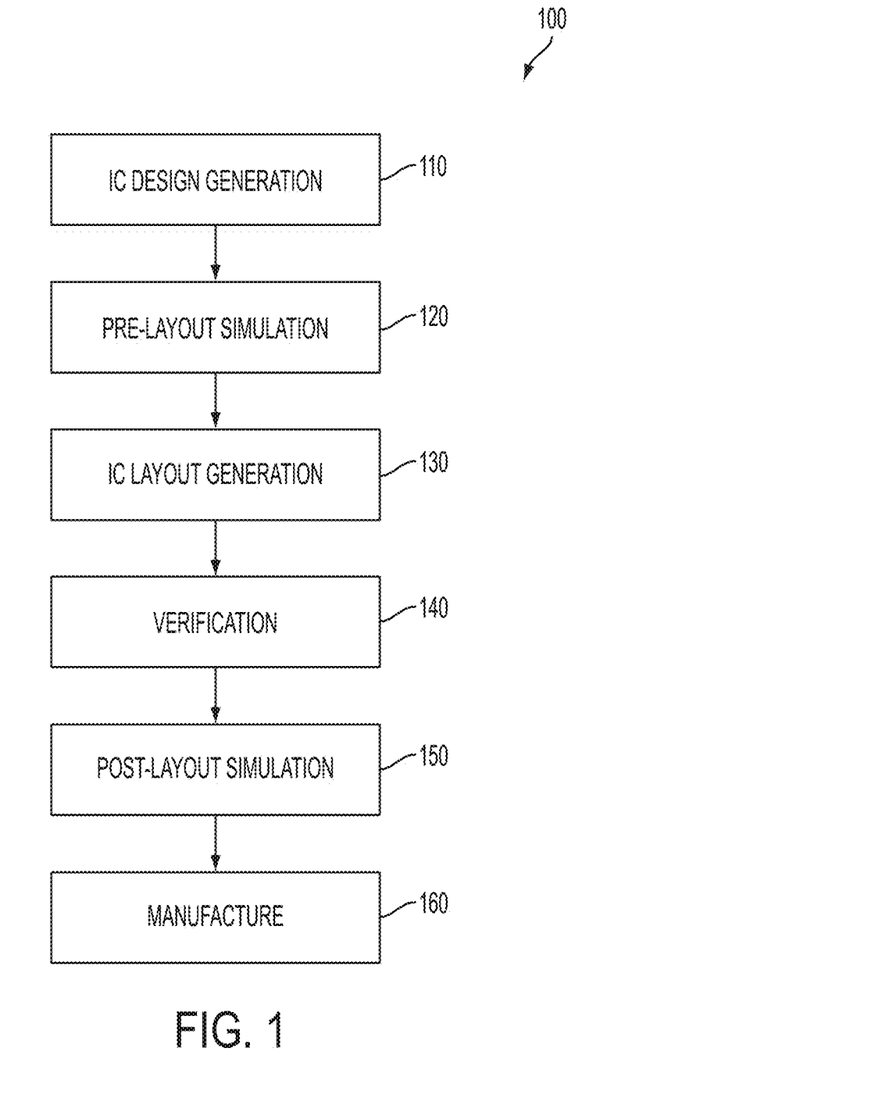
FIG. 1 is a functional flow chart of at least a portion of a semiconductor device design process, in accordance with some embodiments.

FIG. 1 is a functional flow chart of at least a portion of a semiconductor device design process 100 in accordance with some embodiments. The design process 100 utilizes one or more EDA tools for generating, optimizing and verifying a design of a semiconductor device before manufacturing the same device. The EDA tools, in some embodiments, are one or more sets of executable instructions for execution by a processor or controller or a programmed computer to perform the indicated functionality.

At operation 110, a design of a semiconductor device is provided by a circuit designer. In some embodiments, the design of the semiconductor device includes a schematic, i.e., an electrical diagram, of the semiconductor device. In some embodiments, the schematic is generated or provided in the form of a schematic netlist.

At operation 120, a pre-layout simulation is performed on the design to determine whether the design meets a predetermined specification. If the design does not meet the predetermined specification, the semiconductor device is redesigned.

At operation 130, a layout of the semiconductor device is generated based on the design. The layout includes the physical positions of various circuit elements of the semiconductor device as well as the physical positions of various interconnects within and among the circuit elements. In some embodiments, the layout is generated by a placement and routing tool.

At operation 140, one or more verifications and/or checks is/are performed. For example, a layout-versus-schematic (LVS) check is performed to ensure that the generated layout corresponds to the design. For another example, a design rule check (DRC) is performed to ensure that the layout satisfies certain manufacturing design rules, i.e., to ensure that the semiconductor device can be manufactured. If one of the checks fails, correction is made to at least one of the layout or the design by returning the process to operation 110 and/or operation 130.

At operation 150, a post-layout simulation is performed to determine whether the layout meets a predetermined specification. If the simulation result indicates that the layout does not meet the predetermined specification, e.g., if there are undesirable time delays, correction is made to at least one of the layout or the design by returning the process to operation 110 and/or operation 130. Otherwise, the layout is passed to manufacture at operation 160. In some embodiments, one or more of the above-described operations are omitted. For example, the pre-layout simulation at operation 120 or the post-layout simulation at operation 150 is omitted in one or more embodiments.

In some embodiments, the pre-layout simulation at operation 120 and/or the post-layout simulation at operation 150 is/are performed while taking into consideration one or more adjustable and/or variable environment temperatures as described herein. Other arrangements are within the scope of various embodiments. For example, in at least one embodiment, one or more simulations is/are performed during the IC layout generation at operation 130. Such one or more simulations are based on one or more adjustable and/or variable environment temperatures as described herein.

Figure 2:
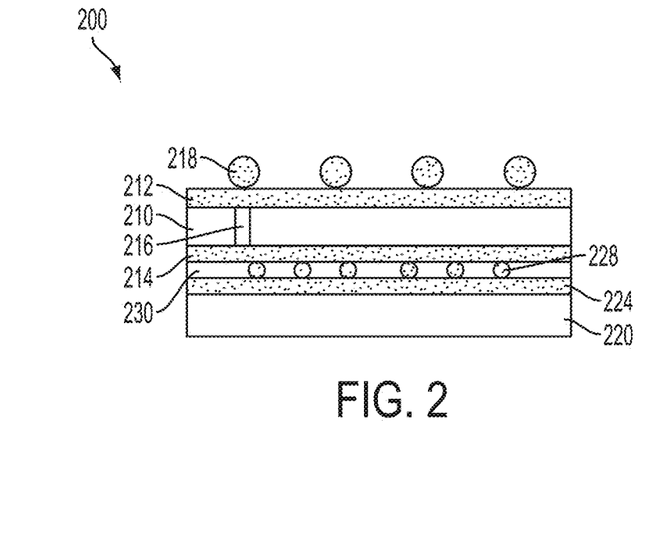
FIG. 2 is a schematic, cross-sectional view of a semiconductor device, in accordance with some embodiments.

FIG. 2 is a schematic, cross-sectional view of a semiconductor device 200 in accordance with some embodiments. The semiconductor device 200 includes a 3D structure having a first die (also referred to as "substrate") 210 and a second die 220 stacked one upon another. In some embodiments, at least one of the first die 210 or second die 220 includes a plurality of interconnected circuit elements (also referred to as "instances"). A circuit element includes one or more active elements and/or one or more passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, planar MOS transistors with raised source/drains. Examples of passive elements include, but are not limited to, capacitors, inductors, fuses, and resistors. Interconnects within or among the circuit elements include, but are not limited to, vias, conductive pads, conductive patterns, conductive redistribution lines (RDLs). In some embodiments, the first die 210 or the second die 220 includes an interposer. In at least one embodiment, the interposer includes one or more active elements and is referred to as an active interposer. In at least one embodiment, the interposer does not include active elements and is referred to as a passive interposer.

The first die 210 has RDLs 212, 214, at least one through substrate via (TSV) or inter layer via (ILV) 216, and a plurality of conductive bumps 218. In some embodiments, RDLs 214, 224 and/or conductive bumps 218 are omitted, and the at least one TSV or ILV 216 electrically connects conductive lines (e.g., vias and/or metal layers) in the first die 210 and the second die 220. The RDLs 212, 214 are arranged on opposite sides of the first die 210 and are electrically connected to one or more circuit elements in the first die 210. The at least one TSV 216 extends through the first die 210 and electrically connects at least one RDL among the RDLs 212 on one side of the first die 210 with at least one RDL among the RDLs 214 on the other side of the first die 210. The conductive bumps 218 are electrically connected to the RDLs 212, and define electrical connection to outside circuitry. The second die 220 has RDLs 224, and a plurality of conductive bumps 228. The RDLs 224 are arranged on a side of the second die 220 and are electrically connected to one or more circuit elements in the second die 220. The conductive bumps 228 electrically connect the RDLs 214 of the first die 210 and the RDLs 224 of the second die 220. An underfill material 230 is formed between the first die 210 and the second die 220, and surrounds the conductive bumps 228

In operation, circuit elements in the first die 210 and/or the second die 220 generate heat. Due to the close proximity between the first die 210 and the second die 220, the generated heat is transferred from one die to the other and increase an environment temperature in which the circuit elements of the other die operate. The increased environment temperature, in turn, affects other performances of the other die. For example, the heat generated by the circuit elements in the first die 210 is transferred to the second die 220, and increases the environment temperature in which the circuit elements of the second die 220 operate. The increased environment temperature, in turn, affects other performances of the second die 220. For example, resistances of conductors in the second die 220 rise with the rising environment temperature. The rising resistance, in turn, increase voltage drops and/or time delays of signals travelling along the conductors. Such increased voltage drop and/or time delays potentially result in signal degradation and/or function faults in the second die 220. Similarly, the heat generated in operation by the circuit elements of the second die 220 potentially affects performances of the first die 210. To minimize the risk of performance degradation and/or function faults in the manufactured semiconductor device, one or more embodiments provide an approach in which an operation of one die is simulated while taking into account thermal effects from operations of the other die. As a result, it is possible to address potentially negative thermal effects associated with real-life operations even when the semiconductor device is being designed.

Figure 3:
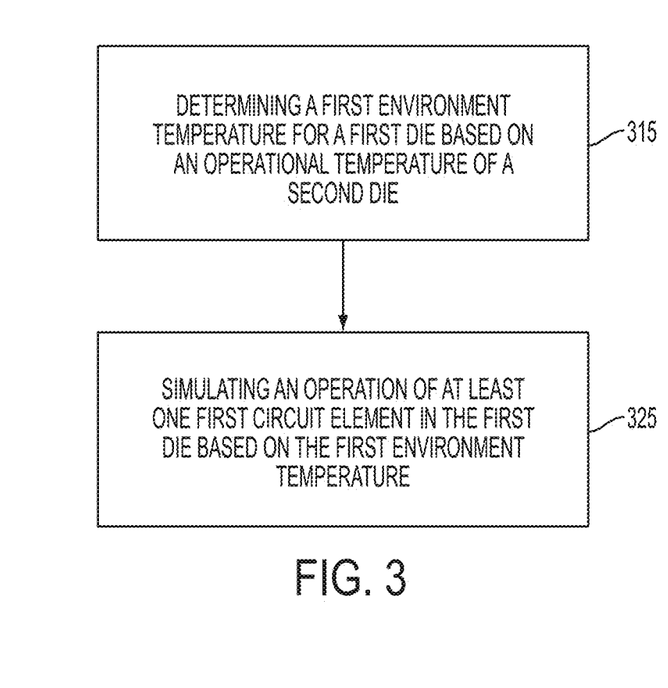
FIG. 3 is a flow chart of a method of designing a semiconductor device, in accordance with some embodiments.

FIG. 3 is a flow chart of a method 300 for designing a semiconductor device, in accordance with some embodiments. In an example embodiment, the method 300 is performed to design the semiconductor device 200 described with respect to FIG. 2.

At operation 315, a first environment temperature for a first die is determined based on an operational temperature of a second die. For example, a first environment temperature for the first die 210 is determined based on an operational temperature of the second die 220. In at least one embodiment, the operational temperature of the second die 220 is determined by simulating an operation of the second die 220. For example, a set of input data (also referred to as "input vector") is inputted into a simulation tool (e.g., as described herein with respect to FIG. 8) which performs a simulation of an operation of the second die 220 in response to the set of input data. The simulation tool generates one or more voltages, currents and/or power signals at one or more circuit elements in the second die 220. An operational temperature of the second die 220 is determined based on the generated one or more voltages, currents and/or power signals. In at least one embodiment, the operational temperature of the second die 220 is determined by using a thermal model of the second die 220, for example, when a design of the second die 220 is provided by an IC designer or an intellectual property (IP) vendor. The thermal model outputs the operational temperature of the second die 220 in response to the set of input data. In at least one embodiment, the obtained operational temperature of the second die 220 is a single temperature for the whole second die 220. In at least one embodiment, the obtained operational temperature of the second die 220 includes several operational temperature values in various areas of the second die 220, as described herein.

The first environment temperature for the first die 210 is determined based on the obtained operational temperature of the second die 220. For example, the first environment temperature of the first die 210 is determined as a function of the obtained operational temperature of the second die 220 and a predetermined ambient temperature. In at least one embodiment, the predetermined ambient temperature is a fixed temperature value, e.g., 25° C., which is the typical room temperature at which some semiconductor devices are designed to operate. For semiconductor devices that are designed to operate in a different environment, e.g., in an outdoor environment, a different predetermined ambient temperature corresponding to that environment is selected in at least one embodiment. In some embodiments, the following temperature function (1) is used to calculate the environment temperature for the first die 210:

$$\text{Temp1} = (\text{Ratio}_A * T_A) + (\text{Ratio}_2 * T_2) \quad (1)$$

where Temp1 is the environment temperature of the first die 210, $T_A$ is the predetermined ambient temperature, $T_2$ is the obtained operational temperature of the second die 220, and $\text{Ratio}_A$ and $\text{Ratio}_2$ are predetermined ratios. The ratios are selected according to one or more characteristics of the semiconductor device 200. Example characteristics include, but are not limited to, applications, manufacturing processes and materials of the semiconductor devices being designed. In an example, the ratio $\text{Ratio}_2$ is selected depending on an application of the second die 220, e.g., the $\text{Ratio}_2$ is lower if the second die 220 is a dynamic random-access memory (DRAM) and the $\text{Ratio}_2$ is higher if the second die 220 is a graphics processing unit (GPU). A reason is that a GPU generates heat more extensively than a DRAM, and has greater thermal effects than a DRAM on the first die 210, which is, for example a central processing unit (CPU). In another example, a process or material used for manufacturing the semiconductor device 200, such as silicon on insulator (SOI), or high K metal gate (HKMG), is also a consideration for selecting the ratios. A reason is that such a process or material affects the semiconductor device's thermal sensitivity and/or heat transfer between the dies of the semiconductor device. In some embodiments, the ratios are empirically determined based on previously designed and/or manufactured semiconductor devices, and stored in a database for subsequent uses. Other temperature functions for calculating the environment temperature for the first die 210 from the operational temperature of the second die 220 are within the scope of various embodiments.

At operation 325, an operation of at least one first circuit element in the first die is simulated based on the first environment temperature. For example, an input vector is inputted into the simulation tool which performs a simulation of an operation of at least one circuit element of the first die 210 in response to the set of input data and the environment temperature determined in operation 315. The simulation results describe the behavior (or performance) of the at least one circuit element of the first die 210 when operating at the determined environment temperature. In at least one embodiment, when the obtained operational temperature of the second die 220 is a single temperature for the whole second die 220, the environment temperature for the first die 210 is a single environment temperature used for simulating various circuit elements on the first die 210. In at least one embodiment, when the obtained operational temperature of the second die 220 includes several operational temperature values in various areas of the second die 220, several environment temperatures are calculated and used for simulating different circuit elements of the first die 210.

Compared to other approaches where an environment temperature is not a consideration in simulating operations of one or more dies in a 3DIC or where a single global environment temperature is used across all dies in the 3DIC, the simulation approach described herein with respect to some embodiments is more accurate. For example, if a predetermined ambient temperature (e.g., 25° C.) is directly used as the environment temperature for simulating the first die 210, the simulation results are far from accurately describing the thermal condition the first die 210 will be subjected to in real life operation of the semiconductor device 200. By taking into account the operational temperature of the second die 220 in the calculation of the environment temperature for the first die 210, the thermal condition under which the first die 210 is simulated is brought closer to the real-life condition. As a result, it is possible in some embodiments, to address potentially negative thermal influences among the dies of a 3DIC, which would otherwise be unlikely discovered by the other approaches.

Figure 4A:
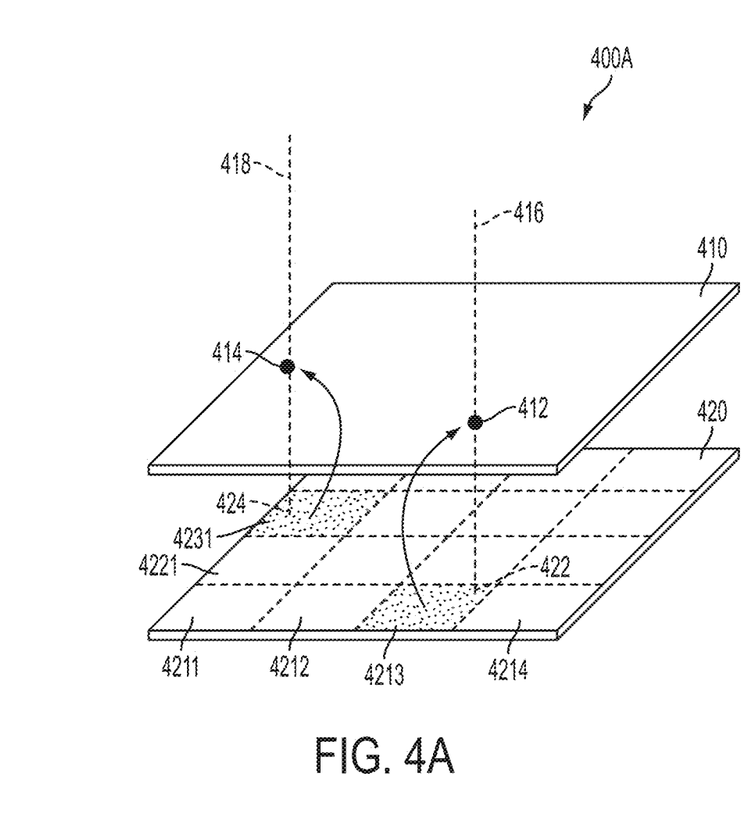
FIGS. 4A, 4B and 5 are schematic, perspective views of various semiconductor devices, showing various approaches to update one or more environment temperatures for simulation purposes, in accordance with some embodiments.

FIG. 4A is a schematic, perspective view of a semiconductor device 400A, showing an approach to update one or more environment temperatures for simulation purposes, in accordance with some embodiments. The semiconductor 400A comprises a first die 410 and a second die 420 stacked one upon another. In at least one amendment, the first die 410 and second die 420 correspond to the first die 210 and second die 220 described with respect to FIG. 2.

In at least one embodiment, the approach described with respect to FIG. 4A is applicable to operation 315 described with respect to FIG. 3. Specifically, one or more environment temperatures for simulating operations of one or more circuit elements in the first die 410 are determined based on one or more operational temperatures of the second die 420. The second die 420 includes a plurality of areas. In the specific example of FIG. 4A, the second die 420 includes sixteen areas arranged in a 4×4 grid. Some of the sixteen areas are denoted as 4211, 4212, 4213, 4221, 4231 in FIG. 4A, the other areas are not denoted to simplify the drawing. Other arrangements of areas in the second die 420 are within the scope of various embodiments. In an example, one or more embodiments use different grid sizes, e.g., 2×2, 3×3, 5×5, etc. In a further example, one or more embodiments use a different type of grid, such as a ring type grid.

In some situations, the operational temperature of the second die 420 varies from one area to another area. For example, a first area 4213 includes a higher density of active elements than a second area 4231, and in operation, generates a higher amount of heat than the second area 4231. As a result, the operational temperature of the second die 420 is higher in the first area 4213 than in the second area 4231. The plurality of operational temperatures in the corresponding areas define an operational temperature profile of the second die 420 which is used to determine one or more environment temperatures for simulating operations of one or more circuit elements in the first die 410.

In some embodiments, the environment temperature for simulating the operation of a circuit element in the first die 410 is determined based on the operational temperature of the second die 420 in an area which corresponds to a location of the circuit element in the first die 410. In the specific example in FIG. 4A, the first die 410 includes a plurality of circuit elements two of which are denoted in FIG. 4A as a first circuit element 412 and a second circuit element 414. The environment temperature for simulating the operation of the first circuit element 412 in the first die 410 is determined based on the operational temperature of the second die 420 in the first area 4213 which corresponds to the first circuit element 412. Similarly, the environment temperature for simulating the operation of the second circuit element 414 in the first die 410 is determined based on the operational temperature of the second die 420 in the second area 4231 which corresponds to the second circuit element 414. In at least one embodiment, the same temperature function is used to calculate the environment temperatures for whole first die 410, including the first circuit element 412 and the second circuit element 414. Because the operational temperatures of the second die 420 differ in the first area 4213 and the second area 4231, the corresponding environment temperatures for simulating the first circuit element 412 and the second circuit element 414 also differ. As a result, in is possible in one or more embodiments to obtain simulation results that accurately describe different thermal effects the second die 420 has on the first die 410 in different regions.

In at least one embodiment, an area of the second die 420 is determined as corresponding to a circuit element of the first die 410 based on the location of the circuit element in the cutoff piece 40. For example, the first area 4213 of the second die 420 is determined as corresponding to the first circuit element 412 of the first die 410 based on the location of the first circuit element 412 in the first die 410.

In some embodiments, for a post-layout simulation as described with respect to operation 150 in FIG. 1, the location, e.g., coordinates, of the first circuit element 412 is extracted from the layout of the semiconductor device, e.g., by an LVS tool. A corresponding location 422 in the second die 420 having the same coordinates as the first circuit element 412 is determined. In the specific example in FIG. 4A, the corresponding location 422 is an intersection of a plane of the second die 420 with a normal line 416 passing through the first circuit element 412. Similarly, a corresponding location 424 in the second die 420 having the same coordinates as the second circuit element 414 is determined and shown in the specific example in FIG. 4A as an intersection of the plane of the second die 420 with a normal line 418 passing through the second circuit element 414. Because the corresponding locations 422, 424 are within the first area 421 and the second area 4231, the first area 4213 is determined as corresponding to the first circuit element 412, and the second area 4231 is determined as corresponding to the second circuit element 414.

In some embodiments, for a pre-layout simulation 120 as described with respect to operation 120 in FIG. 1, because a layout of the semiconductor device is not yet generated, the locations of the first circuit element 412 is estimated by partitioning the design by function block or floor plan. The location of the function block containing the first circuit element 412 is considered as the estimated location of the first circuit element 412. The corresponding area in the second die 420 is determined based on the estimated location of the first circuit element 412 as described herein. The described technique is applicable to the second circuit element 414 and other circuit elements of the first die 410.

As described herein, in some situation, the operational temperature of the second die 420 is not uniform across the second die 420. Such a non-uniform distribution of the operational temperature of the second die 420 has a non-uniform thermal effect on the environment temperatures of various circuit elements at different locations of the first die 410. By determining the environment temperatures for different circuit elements of the first die 410 based on different operational temperatures in corresponding different areas of the second die 420 in accordance with some embodiments, it is possible to take into account not only the operational temperature of the second die 420, but also the non-uniform distribution of the operational temperature across the second die 420. As a result, it is possible in one or more embodiments to further improve the simulation accuracy.

Figure 4B:
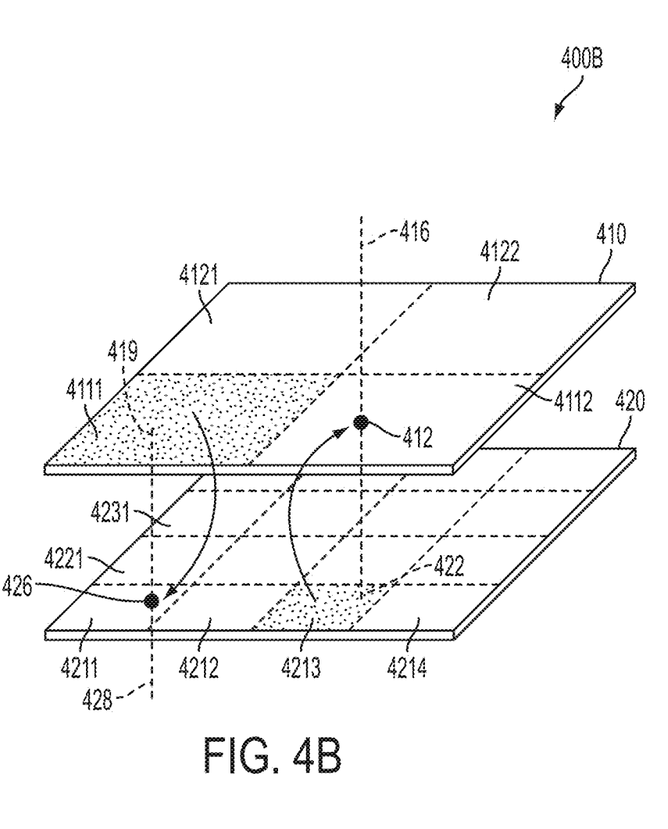

FIG. 4B is a schematic, perspective view of a semiconductor device 400B, showing an approach to update one or more environment temperatures for simulation purposes, in accordance with some embodiments. Identical elements in the semiconductor devices 400A and 400B are denoted in FIGS. 4A and 4B by identical reference numerals.

In at least one embodiment, the approach described with respect to FIG. 4B is applicable to operation 315 described with respect to FIG. 3. This approach considers not only thermal effects from the operation of the second die 420 on the environment temperature for simulating the first die 410, but also the reverse, i.e., thermal effects from the operation of the first die 410 on the environment temperature for simulating the second die 420. For example, an operational temperature profile of the first die 410 is obtained, e.g., by simulating operations of the first die 410 as described herein. The operational temperature profile of the first die 410 includes various operational temperatures of the first die 410 in various corresponding areas. In the specific example shown in FIG. 4B, the first die 410 includes four areas 4111, 4112, 4121, 4122 arranged in a 2×2 grid. Other arrangements of areas in the first die 410 are within the scope of various embodiments.

An environment temperature for simulating an operation of a circuit element 426 in the second die 420 is determined based on the operational temperature in the corresponding area 4111 of the first die 410, as described herein. For example, the location of the circuit element 426 in the second die 420 is extracted, a corresponding location 419 in the first die 410 is identified, and the area 4111 containing the corresponding location 419 is determined as corresponding to the circuit element 426, similar to the manner described with respect to FIG. 4A. The operational temperature of the first die 410 in the area 4111 is used in a temperature function to calculate the environment temperature for the circuit element 426 and an operation of the circuit element 426 is simulated based on the calculated environment temperature, as described with respect to FIG. 3. In at least one embodiment, the temperature function for calculating the environment temperature of the first die 410 from the operational temperature of the second die 420 is different from the temperature function for calculating the environment temperature of the second die 420 from the operational temperature of the first die 410. For example, different ratios $Ratio_2$ are used in the temperature functions.

In some embodiments, the results from the simulation of the second die 420, including the operational temperature profile of the second die 420, are used for updating the environment temperature for simulating the first die 410 in the same simulation in response to the same input vector. Such a process is referred to as co-simulation. In some embodiments, the results from the simulation of the second die 420, including the operational temperature profile of the second die 420, are used for updating the environment temperature for simulating the first die 410 in a future simulation in response to a different input vector. As described herein, by considering the thermal effect of the operation of one die with respect to the environment temperature for simulating the other die, and vice versa, it is possible in one or more embodiments to further improve the simulation accuracy.

Figure 5:
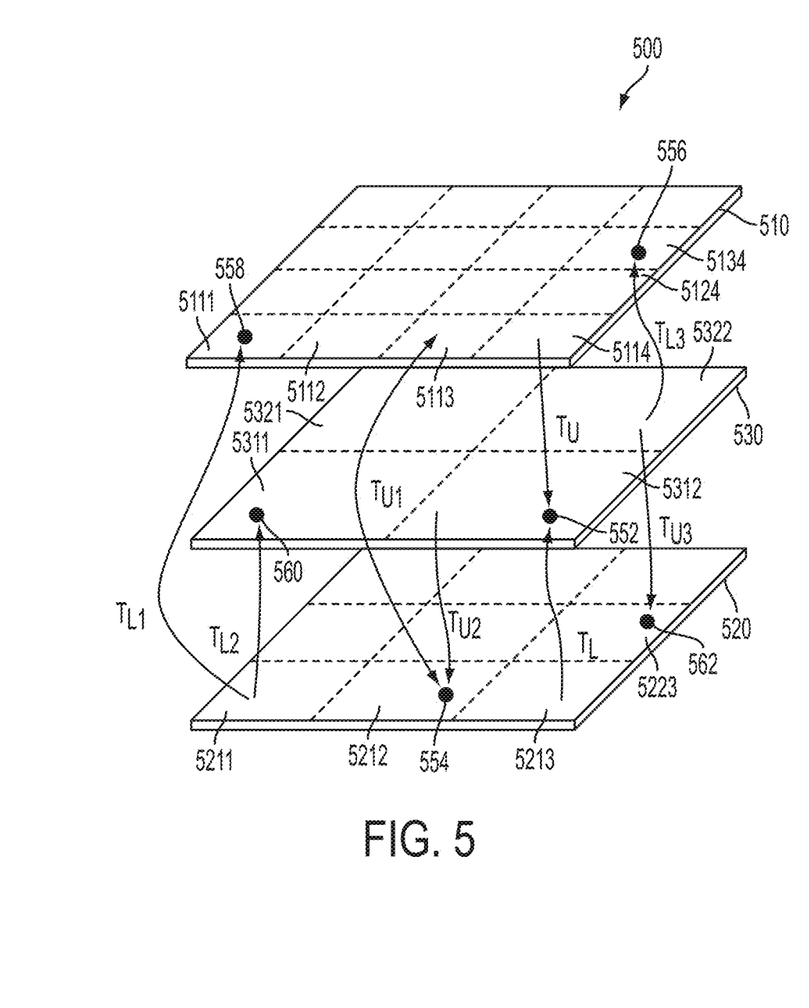

FIG. 5 is a schematic, perspective view of a semiconductor device 500, showing an approach to update one or more environment temperatures for simulation purposes, in accordance with some embodiments. The semiconductor 500 comprises a first die 510, a second die 520, and third die 530 stacked one upon another, with the third die 530 sandwiched between the first die 510 and the second die 520. In the specific example in FIG. 5, the first die 510 has a first operational temperature profile including a plurality of operational temperatures in sixteen corresponding areas arranged in a 4×4 grid. Some of the sixteen areas are denoted as 5111, 5112, 5113, 5114, 5124, 5134 in FIG. 5, the other areas are not denoted to simplify the drawing. The second die 520 has a second operational temperature profile including a plurality of operational temperatures in nine corresponding areas arranged in a 3×3 grid. Some of the nine areas are denoted as 5211, 5212, 5213, 5223 in FIG. 5, the other areas are not denoted to simplify the drawing. The third die 530 has a third operational temperature profile including a plurality of operational temperatures in four corresponding areas 5211, 5311, 5312, 5321, 5322 arranged in a 2×2 grid. Other arrangements of the areas of one or more of the dies 510, 520, 530 are within the scope of various embodiments. In one or more embodiments, the semiconductor device 500 includes more than three dies stacked one upon another.

In some embodiments, the environment temperature for simulating one die is determined based on the operational temperatures of two or more other dies. For example, the environment temperature for simulating the circuit element 552 of the third die 530 is determined based on the operational temperature $T_U$ of the first die 510 in the area 5114 corresponding to the circuit element 552. The environment temperature for simulating the circuit element 552 is also determined based on the operational temperature $T_L$ of the second die 520 in the area 5213 corresponding to the circuit element 552. The area 5114 and area 5213 are determined as corresponding to the circuit element 552 in a manner similar to that described with respect to FIG. 4A. In some embodiments, the following temperature function (2) is used to calculate the environment temperature for the third die 530:

$$\text{Temp}=(\text{Ratio}_A*T_A)+(\text{Ratio}_U*T_U)+(\text{Ratio}_L*T_L) \quad (2)$$

where Temp is the environment temperature for simulating a circuit element of the third die 530, $T_A$ is the predetermined ambient temperature, $T_U$ and $T_L$ are the obtained operational temperatures of the first die 510 and the second die 520 in the areas corresponding to the circuit element to be simulated, and $\text{Ratio}_A$, $\text{Ratio}_U$ and $\text{Ratio}_L$ are predetermined ratios. The ratios are selected according to one or more characteristics of the semiconductor device 500 as described with respect to semiconductor device 200. In one example, the first die 510 is a DRAM, the second die 520 is a GPU, the third die 530 is a CPU, $T_A$=25° C., $\text{Ratio}_A$=1.0, $T_U$=80° C., $\text{Ratio}_U$=0.2, $T_L$=40° C., and $\text{Ratio}_L$=0.3. The calculated environment temperature Temp for simulating the circuit element of the third die 530 is 53° C. which is significantly higher than the ambient temperature of 25° C., and reflects a real-life thermal condition under which the third die 530 is to be operated.

In one or more embodiments, the environment temperature for simulating one die is calculated based on operational temperatures of immediately adjacent dies. For example, the environment temperature for simulating the third die 530 is calculated based on operational temperatures of the first die 510 and second die 520 which are immediately adjacent the third die 530. However, it is possible in one or more embodiments to consider operational temperatures of a die not immediately adjacent the die to be simulated. For example, the environment temperature of a circuit element 554 of the second die 520 is determined based not only on the operational temperature $T_{U2}$ in the corresponding area 5312 of the immediately adjacent third die 530, but also on the operational temperature $T_{U1}$ in the corresponding area 5113 of the more distant first die 510. A similar temperature function to the temperature function (2) is used, with one or more different ratios. In at least one embodiment, this approach is utilized when the distant die, e.g., the first die 510, generates a high amount of heat in operation, e.g., when the first die 510 is a CPU.

In one or more embodiments, the environment temperature for simulating one die is calculated based on operational temperatures of all other dies. For example, the environment temperature for simulating the third die 530 is calculated based on operational temperatures of the other dies in the semiconductor device 500, i.e., the first die 510 and second die 520. However, it is possible in one or more embodiments to omit one or more dies from the environment temperature calculation. For example, the environment temperature for simulating a circuit element 556 of the first die 510 is determined based on the operational temperature $T_{L2}$ in the corresponding area 5322 of the third die 530, without considering operational temperatures of the second die 520. A similar temperature function to the temperature function (1) described with respect to FIGS. 2-3 is used. In another example, the environment temperature for simulating a circuit element 558 of the first die 510 is determined based on the operational temperature $T_{L1}$ in the corresponding area 5211 of the second die 520, without considering operational temperatures of the third die 530 even though the third die 530 is closer to the first die 510 than the second die 520. In at least one embodiment, this approach is utilized when the omitted die is a passive interposer which is not a significant heat source in operation.

In one or more embodiments, the operational temperature of one die is used to determine the environment temperature for simulating another die and vice versa, as described with respect to FIG. 4B. For example, the environment temperature for simulating a circuit element 560 of the third die 530 is determined based on the operational temperature $T_{L2}$ in the corresponding area 5211 of the second die 520, whereas the environment temperature for simulating a circuit element 562 of the second die 520 is determined based on the operational temperature $T_{U3}$ in the corresponding area 5322 of the third die 530.

Figure 6:
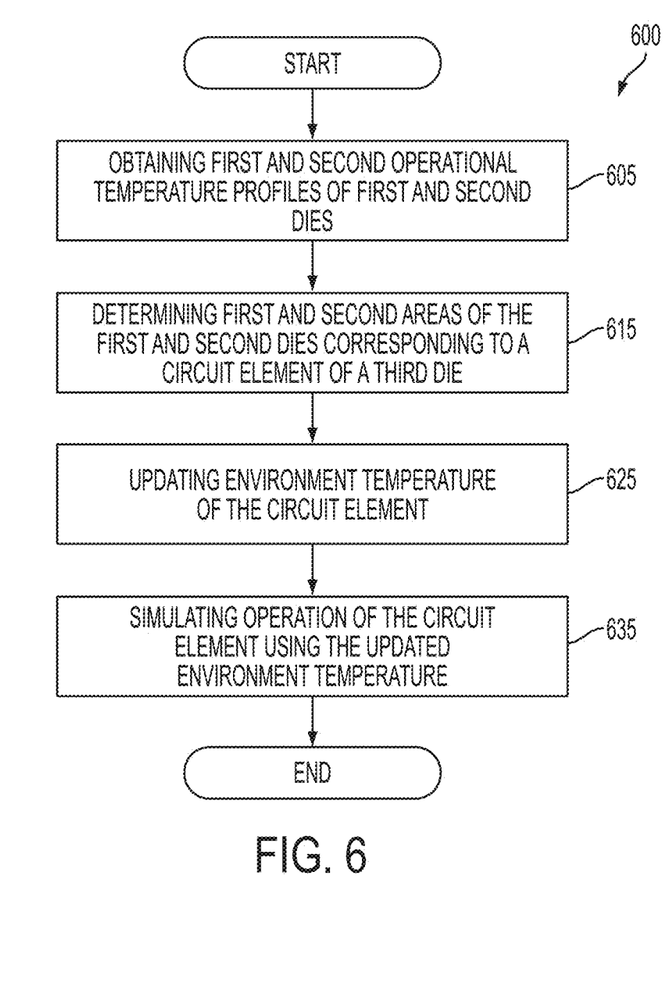
FIG. 6 is flow chart of a method of designing a semiconductor device, in accordance with some embodiments.

FIG. 6 is flow chart of a method 600 of designing a semiconductor device, in accordance with some embodiments. In at least one embodiment, the method 600 is performed to design the semiconductor device 500 described with respect to FIG. 5.

At operation 605, first and second operational temperature profiles of first and second dies are obtained. For example, the first and second operational temperature profiles of the first die 510 and second die 520 are obtained, as described with respect to FIGS. 7A-7F. The obtained first and second operational temperature profiles provide information on various operational temperatures of the first die 510 and second die 520 in corresponding areas of the first die 510 and second die 520.

At operation 615, first and second areas of the first and second dies corresponding to a circuit element of a third die are determined. For example, the first area 5114 of the first die 510 and the second area 5213 of the second die 520 which correspond to the circuit element 552 of the third die 530 are determined as described with respect to FIGS. 4A and 5.

At operation 625, the environment temperature of the circuit element is updated. For example, the environment temperature of the circuit element 552 is updated based on the operational temperatures in the corresponding areas, as described with respect to FIG. 5.

At operation 635, an operation of the circuit element is simulated using the updated environment temperature. For example, the operation of the circuit element 552 is simulated as described with respect to FIGS. 2-3.

Figure 7A:
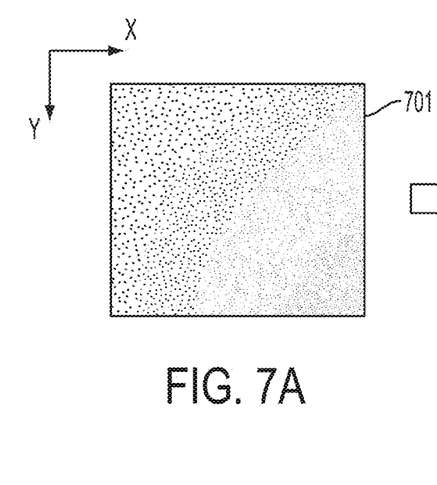
FIGS. 7A-7F are schematic plan views of various dies, showing various approaches to obtain operational temperature profiles for simulation purposes, in accordance with some embodiments.

FIGS. 7A-7F are schematic plan views of various dies, showing various approaches to obtain operational temperature profiles for simulation purposes, in accordance with some embodiments. In an example, an operation of a die 701 is simulated and a distribution of operational temperatures of the die 701 is obtained as shown in FIG. 7A. Alternatively, a thermal model of the die 701 is used to calculate the distribution of operational temperatures of the die 701. The obtained distribution of operational temperatures is shown in FIG. 7A in the form of a heat map. The distribution of operational temperatures in FIG. 7A shows temperature variations in various directions. For example, the temperature in the distribution of FIG. 7A varies in both the X-direction and Y-direction.

Figure 7B:
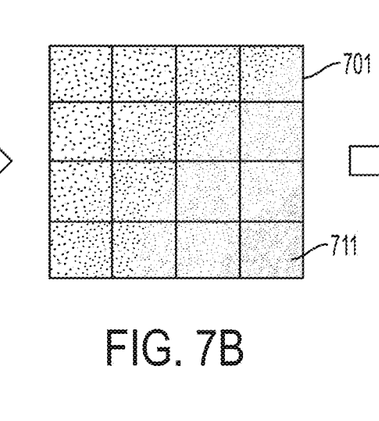
Figure 7C:
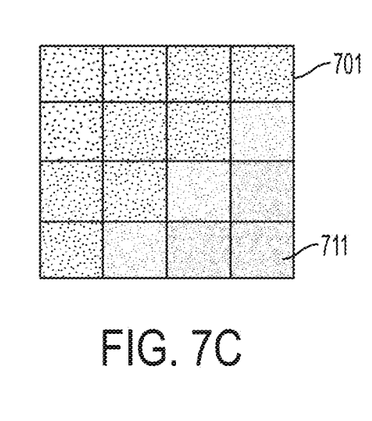

In at least one embodiment, to accurately describe significant variations of the operational temperatures the die 701, a grid of a small grid size is used to generate the operational temperature profile. For example, as shown in FIG. 7B, a 4×4 grid is used to generate the operational temperature profile for the die 701. For each area (or cell) of the grid, an operational temperature to be included in the operational temperature profile is derived from the operational temperatures of various circuit elements in the area. For example, an area 711 of the grid shown in FIG. 7B includes a plurality of circuit elements having various operational temperatures which are averaged to obtain an operational temperature to be included in the operational temperature profile for the area 711. Operational temperatures for the other areas of the grid are obtained similarly. The obtained operational temperature profile is shown in FIG. 7C as including sixteen areas with sixteen operational temperatures derived from the operational temperatures of various circuit elements in the corresponding areas.

Figure 7D:
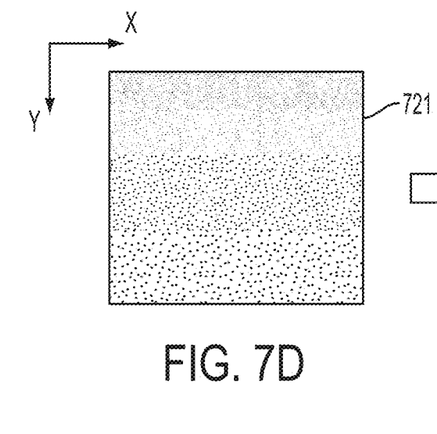
Figure 7E:
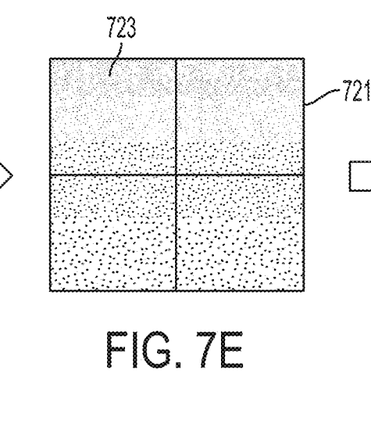
Figure 7F:
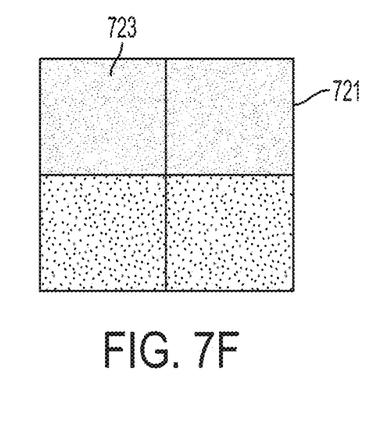

In a further example, a distribution of operational temperatures of a die 721 is obtained as shown in FIG. 7D. The distribution of operational temperatures in FIG. 7l) is more uniform than the one shown in FIG. 7A, especially in the X-direction. In at least one embodiment, a grid of a larger grid size than that used for FIG. 7A is used to generate the operational temperature profile for the die 721. For example, as shown in FIG. 7E, a 2×2 grid is used. For each area (or cell) of the grid, an operational temperature to be included in the operational temperature profile is derived from the operational temperatures of various circuit elements in the area, as described with respect to FIGS. 7A-7C. For example, an area 723 of the grid shown in FIG. 7B includes a plurality of circuit elements having various operational temperatures which are averaged to obtain an operational temperature to be included in the operational temperature profile for the area 723. Operational temperatures for the other areas of the grid are obtained similarly. The obtained operational temperature profile is shown in FIG. 7F.

As the grid size is reduced, the accuracy is increased but so is the amount of calculation. In some embodiments, the selection of the grid size for determining an operational temperature profile of a die depends on one or more factors, including, but not limited to, the operational temperature distribution of the die, the intended accuracy of, and the available computational resources.

Figure 8:
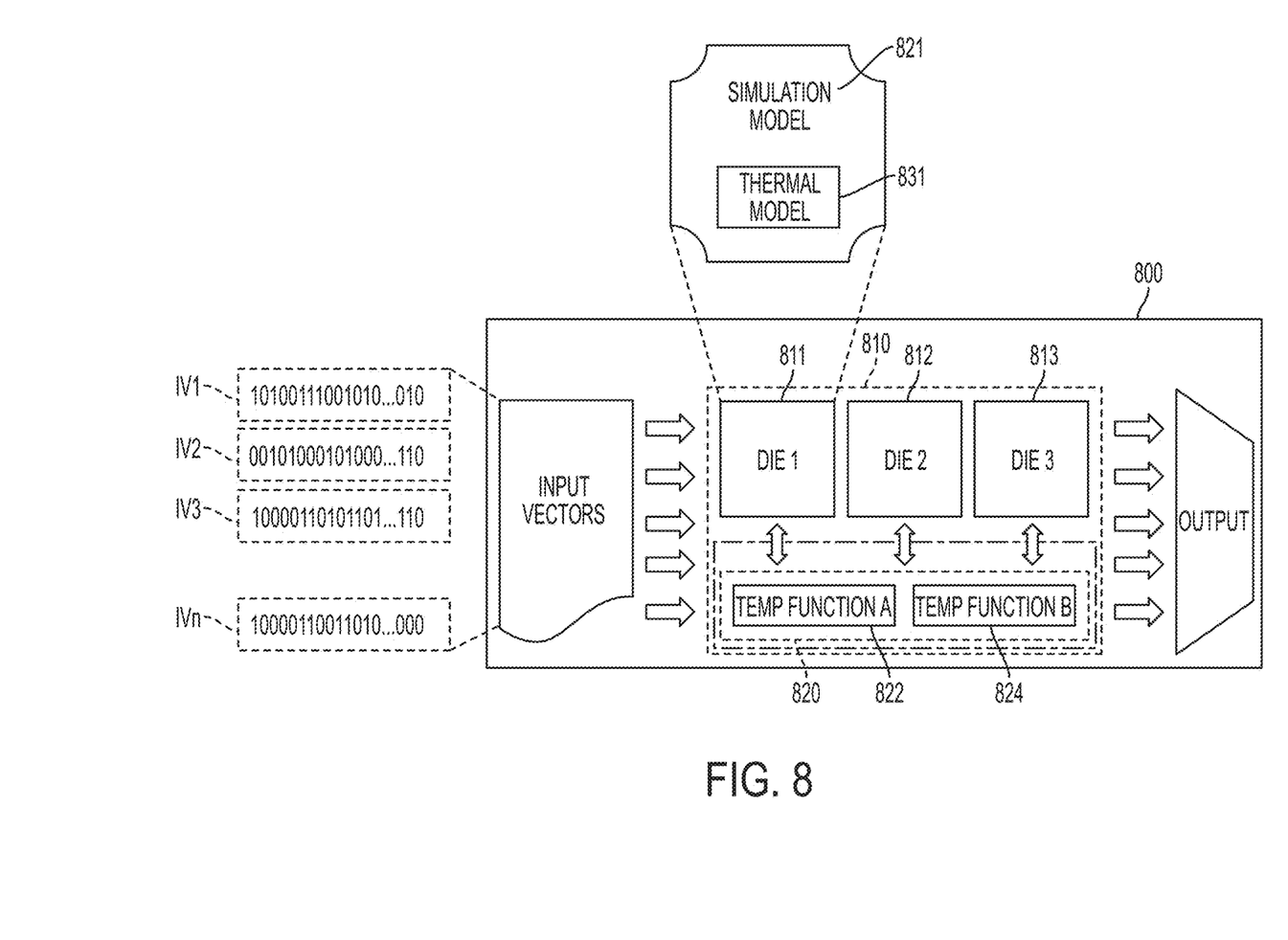
FIG. 8 is a schematic, block diagram of a system for designing a semiconductor device, in accordance with some embodiments.

FIG. 8 is a schematic, block diagram of a system 800 for designing a semiconductor device, in accordance with some embodiments. In at least one embodiment, the system 800 is configured to design the semiconductor device 500 described with respect to FIG. 5. In some embodiments, the system 800 is configured to perform one or more operations described with respect to FIG. 1. The system 800 includes a simulation tool 810 which receives a design under test, i.e., a first die 811, a second die 812 and a third die 813. The dies 811, 812, 813 are configured to be stacked one upon another to form a 3DIC. In at least one embodiment, one or more of the dies 811, 812, 813, e.g., the first die 811, are provided with a simulation model 821 and a thermal model 831. In at least one embodiment, the dies 811, 812, 813 correspond to the first die 510, second die 520 and third die 530 described with respect to FIG. 5.

The simulation tool 810 further receives a series of input vectors IV1, IV2, IV3 . . . IVn sequentially inputted into the simulation tool 810. The simulation tool 810 is configured to perform a series of simulations of operations of one or more dies 811, 812, 813 in response to the corresponding input vectors. For example, when the input vector IV1 is inputted into the simulation tool 810, the simulation tool 810 runs a simulation of operations of the dies 811, 812, 813 in response to the input vector IV1, and outputs the simulation results for evaluation. Then, the next input vector IV2 is inputted into the simulation tool 810, the simulation tool 810 runs another simulation of operations of the dies 811, 812, 813 in response to the input vector IV2, and outputs the simulation results for evaluation. The process repeats until a simulation in response to the last input vector IVn has been complete. In some embodiments, the simulation tool 810's calculation of simulation results by using a simulation model 821 is also considered a simulation.

In some embodiments, the simulation tool 810 is configured to adjust, for at least one simulation in the series of simulations, at least one environment temperature for simulating one die based on an operational temperature profile of another die. For example, a predetermined ambient temperature is used as the environment temperature for simulating the dies 811, 812, 813 in response to the input vector IV1. Based on the simulation and/or by consulting a thermal model such as the thermal model 831, operational temperature profiles of the dies are obtained, as described with respect to FIGS. 7A-7F. Environment temperatures for simulating at least one die, e.g., the third die 813, are updated based on the operational temperature profile of at least another die, e.g., the first die 811 and second die 812, as described with respect to FIGS. 2-5. The updated environment temperatures are used for simulating the third die 813 in the same simulation responsive to the input vector IV1, or in a subsequent simulation responsive to another input vector, such as input vector IV2.

In at least one embodiment, the simulation tool 810 is configured to vary an updating frequency for updating the environment temperatures. As the updating frequency is increased, the simulation accuracy is also increased. In at least one embodiment, the environment temperatures are updated at every simulation. In one or more embodiments, the environment temperatures are updated after a predetermined number of, e.g., 3, simulations. In some embodiments, the updating frequency for one die is different from the updating frequency for another die.

In at least one embodiment, the simulation tool 810 includes a memory 820 storing a plurality of different temperature functions A, B, for calculating the environment temperatures. The simulation tool 810 is configured to select, in accordance with at least one characteristic of the 3DIC, one or more temperature functions to adjust the at least one environment temperature, as described herein with respect to FIGS. 2-3.

In at least one embodiment, the simulation tool 810 is configured to vary a grid size of the operational temperature profiles of one or more dies 811, 812, 813, as described with respect to FIGS. 7A-7F. As the grid size is reduced, the simulation accuracy is increased.

Figure 9:
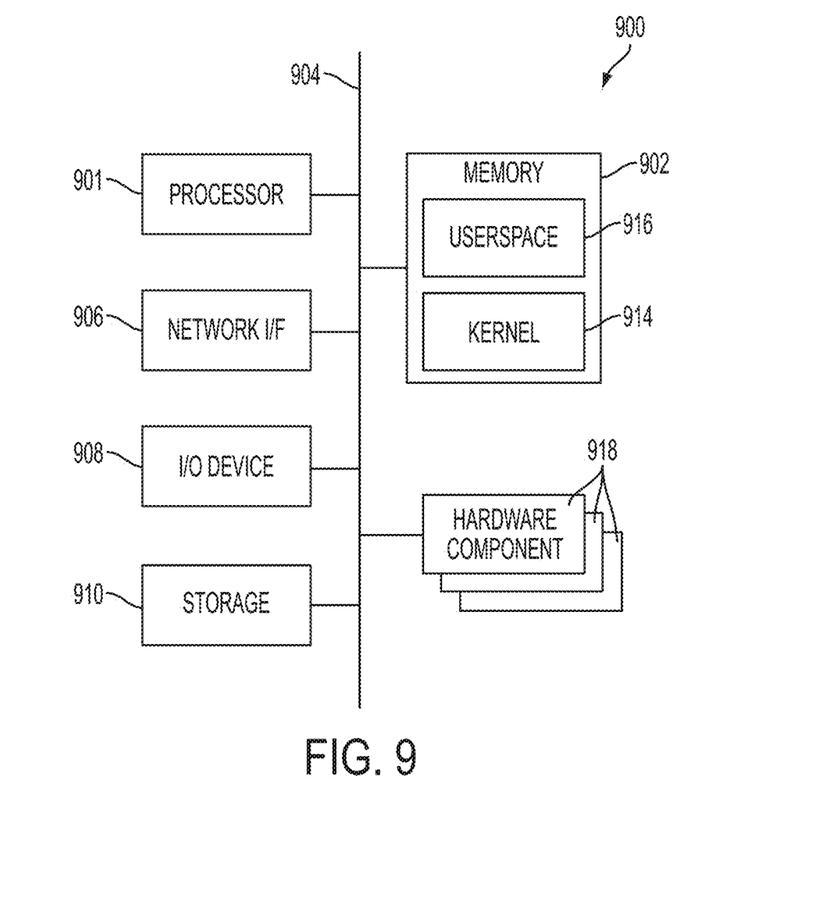
FIG. 9 is a block diagram of a computer system, in accordance with some embodiments

FIG. 9 is a block diagram of a computer system 900 in accordance with some embodiments. One or more of the tools and/or engines and/or systems and/or operations described with respect to FIGS. 1-8 is realized in some embodiments by one or more computer systems 900 of FIG. 9. The system 900 comprises at least one processor 901, a memory 902, a network interface (I/F) 906, a storage 910, an input/output (I/O) device 908 communicatively coupled via a bus 904 or other interconnection communication mechanism.

The memory 902 comprises, in some embodiments, a random access memory (RAM) and/or other dynamic storage device and/or read only memory (ROM) and/or other static storage device, coupled to the bus 904 for storing data and/or instructions to be executed by the processor 901, e.g., kernel 914, user space 916, portions of the kernel and/or the user space, and components thereof. The memory 902 is also used, in some embodiments, for storing temporary variables or other intermediate information during execution of instructions to be executed by the processor 901.

In some embodiments, a storage device 910, such as a magnetic disk or optical disk, is coupled to the bus 904 for storing data and/or instructions, e.g., kernel 914, user space 916, etc. The I/O device 908 comprises an input device, an output device and/or a combined input/output device for enabling user interaction with the system 900. An input device comprises, for example, a keyboard, keypad, mouse, trackball, trackpad, and/or cursor direction keys for communicating information and commands to the processor 901. An output device comprises, for example, a display, a printer, a voice synthesizer, etc. for communicating information to a user.

In some embodiments, one or more operations and/or functionality of the tools and/or engines and/or systems described with respect to FIGS. 1-8 are realized by the processor 901, which is programmed for performing such operations and/or functionality. In some embodiments, the processor 901 is configured as specifically configured hardware (e.g., one or more application specific integrated circuits (ASICs)). One or more of the memory 902, the I/F 906, the storage 910, the I/O device 908, the hardware components 918, and the bus 904 is/are operable to receive instructions, data, design constraints, design rules, netlists, layouts, models and/or other parameters for processing by the processor 901.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

An aspect of the description relates to a system including a memory; and a simulation tool connected to the memory. The simulation tool is configured to receive information related to a plurality of dies. The simulation tool is further configured to receive a plurality of input vectors. The simulation tool is further configured to determine a temperature profile for a first die of the plurality of dies. The simulation tool is further configured to simulate operation of a second die of the plurality of dies based on the determined temperature profile and the received plurality of input vectors. In some embodiments, the simulation tool is further configured to simulate operation of a third die of the plurality of dies based on the determined temperature profile and the received plurality of input vectors. In some embodiments, the simulation tool is configured to divide the first die into a first plurality of grids, and divide the second die into a second plurality of grids. In some embodiments, the simulation tool is configured to simulate the operation of a first grid of the second plurality of grids based on at least one grid of the first plurality of grids overlapped by the first grid. In some embodiments, the simulation tool is configured to simulate the operation of the first grid based on an average temperature of the at least one grid. In some embodiments, the simulation tool is configured to simulate the operation of at least one grid of the second plurality of grids based on a first grid of the first plurality of grids overlapped by the at least one grid. In some embodiments, the simulation tool is configured to divide the first die into the first plurality of grids based on the determined temperature profile. In some embodiments, the simulation tool is configured to determine an average temperature for each grid of the first plurality of grids. In some embodiments, the simulation tool is configured to simulate operation of the second die based on an ambient temperature and at least one of the received plurality of input vectors. In some embodiments, the simulation tool is configured to instruct at least one tool for manufacturing a semiconductor device in response to the simulated operation of the second die satisfying design parameters.

An aspect of this description relates to a system includes a memory configured to store a plurality of temperature functions; and a simulation tool connected to the memory. The simulation tool is configured to receive information related to a plurality of dies. The simulation tool is further configured to receive a plurality of input vectors. The simulation tool is further configured to determine a temperature profile for a first die of the plurality of dies. The simulation tool is further configured to simulate operation of a second die of the plurality of dies based on the determined temperature profile, the received plurality of input vectors and at least one temperature function of the plurality of temperature functions. In some embodiments, the simulation tool is configured to select a temperature function from the plurality of temperature functions and determine the temperature profile of the first die based on the selected temperature function. In some embodiments, the simulation tool is further configured to simulate operation of a third die of the plurality of dies based on the determined temperature profile, the received plurality of input vectors and at least one temperature function of the plurality of temperature functions. In some embodiments, the simulation tool is configured to update the temperature profile periodically. In some embodiments, the simulation tool is configured to instruct at least one tool for manufacturing a semiconductor device in response to the simulated operation of the second die satisfying design parameters.

An aspect of this description relates to a system including a memory; and a simulation tool connected to the memory. The simulation tool is configured to receive information related to a plurality of dies. The simulation tool is further configured to receive a plurality of input vectors. The simulation tool is further configured to determine a temperature profile for a first die of the plurality of dies. The simulation tool is further configured to divide the temperature profile of the first die into a plurality of grids. The simulation tool is further configured to vary a grid size of the plurality of grids. The simulation tool is further configured to simulate operation of a second die of the plurality of dies based on the determined temperature profile for a first grid size of the plurality of grids and the received plurality of input vectors. The simulation tool is further configured to simulate operation of a second die of the plurality of dies based on the determined temperature profile for a second grid size of the plurality of grids and the received plurality of input vectors. In some embodiments, the simulation tool is further configured to simulate operation of a third die of the plurality of dies based on the determined temperature profile for the first grid size and the received plurality of input vectors. In some embodiments, the simulation tool is further configured to simulate operation of a third die of the plurality of dies based on the determined temperature profile for the second grid size and the received plurality of input vectors. In some embodiments, the simulation tool is configured to instruct at least one tool for manufacturing a semiconductor device in response to the simulated operation of the second die and the third die satisfying design parameters. In some embodiments, the simulation tool is configured to instruct at least one tool for manufacturing a semiconductor device in response to the simulated operation of the second die satisfying design parameters.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system comprising:
a memory; and
a simulation tool connected to the memory, wherein the simulation tool is configured to:
receive information related to a plurality of dies,
receive a plurality of input vectors,
determine a temperature profile for a first die of the plurality of dies, and
simulate operation of a second die of the plurality of dies based on the determined temperature profile and the received plurality of input vectors.

2. The system of claim 1, wherein the simulation tool is further configured to simulate operation of a third die of the plurality of dies based on the determined temperature profile and the received plurality of input vectors.

3. The system of claim 1, wherein the simulation tool is configured to:
divide the first die into a first plurality of grids, and
divide the second die into a second plurality of grids.

4. The system of claim 3, wherein the simulation tool is configured to simulate the operation of a first grid of the second plurality of grids based on at least one grid of the first plurality of grids overlapped by the first grid.

5. The system of claim 4, wherein the simulation tool is configured to simulate the operation of the first grid based on an average temperature of the at least one grid.

6. The system of claim 3, wherein the simulation tool is configured to simulate the operation of at least one grid of the second plurality of grids based on a first grid of the first plurality of grids overlapped by the at least one grid.

7. The system of claim 3, wherein the simulation tool is configured to divide the first die into the first plurality of grids based on the determined temperature profile.

8. The system of claim 3, wherein the simulation tool is configured to determine an average temperature for each grid of the first plurality of grids.

9. The system of claim 1, wherein the simulation tool is configured to simulate operation of the second die based on an ambient temperature and at least one of the received plurality of input vectors.

10. The system of claim 1, wherein the simulation tool is configured to instruct at least one tool for manufacturing a semiconductor device in response to the simulated operation of the second die satisfying design parameters.

11. A system comprising:
a memory configured to store a plurality of temperature functions; and
a simulation tool connected to the memory, wherein the simulation tool is configured to:
receive information related to a plurality of dies,
receive a plurality of input vectors,
determine a temperature profile for a first die of the plurality of dies, and
simulate operation of a second die of the plurality of dies based on the determined temperature profile, the received plurality of input vectors and at least one temperature function of the plurality of temperature functions.

12. The system of claim 11, wherein the simulation tool is configured to select a temperature function from the plurality of temperature functions and determine the temperature profile of the first die based on the selected temperature function.

13. The system of claim 11, wherein the simulation tool is further configured to simulate operation of a third die of the plurality of dies based on the determined temperature profile, the received plurality of input vectors and at least one temperature function of the plurality of temperature functions.

14. The system of claim 11, wherein the simulation tool is configured to update the temperature profile periodically.

15. The system of claim 11, wherein the simulation tool is configured to instruct at least one tool for manufacturing a semiconductor device in response to the simulated operation of the second die satisfying design parameters.

16. A system comprising:
a memory; and
a simulation tool connected to the memory, wherein the simulation tool is configured to:
receive information related to a plurality of dies,
receive a plurality of input vectors,
determine a temperature profile for a first die of the plurality of dies,
divide the temperature profile of the first die into a plurality of grids,
vary a grid size of the plurality of grids,
simulate operation of a second die of the plurality of dies based on the determined temperature profile for a first grid size of the plurality of grids and the received plurality of input vectors, and simulate operation of a second die of the plurality of dies based on the determined temperature profile for a second grid size of the plurality of grids and the received plurality of input vectors.

17. The system of claim 16, wherein the simulation tool is further configured to simulate operation of a third die of the plurality of dies based on the determined temperature profile for the first grid size and the received plurality of input vectors.

18. The system of claim 17, wherein the simulation tool is further configured to simulate operation of a third die of the plurality of dies based on the determined temperature profile for the second grid size and the received plurality of input vectors.

19. The system of claim 17, wherein the simulation tool is configured to instruct at least one tool for manufacturing a semiconductor device in response to the simulated operation of the second die and the third die satisfying design parameters.

20. The system of claim 16, wherein the simulation tool is configured to instruct at least one tool for manufacturing a semiconductor device in response to the simulated operation of the second die satisfying design parameters.

* * * * *